US011942037B1

(12) United States Patent
Lian et al.

(10) Patent No.: US 11,942,037 B1
(45) Date of Patent: Mar. 26, 2024

(54) ORGANIC LIGHT EMITTING DIODE DISPLAY CONTROL CIRCUIT AND CONTROL METHOD THEREOF

(71) Applicant: Novatek Microelectronics Corp., Hsinchu (TW)

(72) Inventors: Zi-Yi Lian, Miaoli County (TW); Yen-Tao Liao, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/318,645

(22) Filed: May 16, 2023

(51) Int. Cl.
*G09G 3/3233* (2016.01)

(52) U.S. Cl.
CPC ... *G09G 3/3233* (2013.01); *G09G 2320/0247* (2013.01); *G09G 2340/0435* (2013.01)

(58) Field of Classification Search
CPC ......... G09G 3/3233; G09G 2320/0247; G09G 2340/0435
See application file for complete search history.

(56) References Cited

U.S. PATENT DOCUMENTS

| | | | | |
|---|---|---|---|---|
| 11,483,530 | B1 * | 10/2022 | Shih | G09G 3/3208 |
| 11,763,738 | B1 * | 9/2023 | Wang | G09G 3/32<br>345/691 |
| 2012/0320030 | A1 * | 12/2012 | Origuchi | G09G 3/2927<br>345/214 |
| 2017/0154557 | A1 * | 6/2017 | Shon | G09G 3/3275 |
| 2019/0088199 | A1 * | 3/2019 | Zhang | G09G 3/3258 |
| 2021/0201793 | A1 * | 7/2021 | Lin | G09G 3/3233 |
| 2022/0051631 | A1 * | 2/2022 | Cheon | G09G 3/2096 |

* cited by examiner

*Primary Examiner* — Dmitriy Bolotin
(74) *Attorney, Agent, or Firm* — JCIPRNET

(57) ABSTRACT

An organic light emitting diode (OLED) display control circuit and a control method thereof are provided. The OLED control circuit includes a counting unit, a judgment unit, a remainder calculation unit and a signal compensation unit. The counting unit counts display lines of a current frame according to a vertical synchronization signal to generate a first count value. The judgment unit compares the first count value and a second count value to generate a judgment result. The second count value represents the number of display lines of a previous frame preceding to the current frame. The remainder calculation unit calculates a remainder generated by dividing the first count value by a period of an emission control signal. The signal compensation unit adjusts the emission control signal to compensate for an incomplete period of the emission control signal occurring in the end of the current frame period.

13 Claims, 6 Drawing Sheets

ORGANIC LIGHT EMITTING DIODE DISPLAY CONTROL CIRCUIT AND CONTROL METHOD THEREOF

BACKGROUND

Technical Field

The disclosure relates a control circuit and a control method; particularly, the disclosure relates to an organic light emitting diode (OLED) display control circuit and a control method thereof.

Description of Related Art

For a general organic light emitting diode (OLED) display device, when the frame rate of the image signal that the OLED display device receives from an image source device changes due to the variable refresh rate (VRR) function, images displayed on the OLED display panel may flicker consequently.

SUMMARY

The organic light emitting diode (OLED) display control circuit includes a counting unit, a judgment unit, a remainder calculation unit and a signal compensation unit. The counting unit is configured to, with respect to each current frame, count display lines of a current frame according to a vertical synchronization signal to generate a first count value representing the number of display lines of the current frame. The judgment unit is coupled to the counting unit, and configured to compare the first count value and a second count value to generate a judgment result. The second count value is generated by the counting unit before the first count value is generated. The second count value represents the number of display lines of a previous frame preceding to the current frame. The remainder calculation unit is coupled to the judgment unit, and configured to, in response to that the current frame is the first frame after the frame rate changes, calculate a remainder generated by dividing the first count value by a period of an emission control signal, wherein the emission control signal is utilized for control driving an OLED display panel. The signal compensation unit is coupled to the remainder calculation unit, and configured to adjust the emission control signal to compensate for an incomplete period of the emission control signal occurring in the end of the current frame period.

The OLED display control method includes the following steps: with respect to each current frame, counting display lines of a current frame according to a vertical synchronization signal to generate a first count value representing the number of display lines of the current frame; comparing the first count value and a second count value to generate a judgment result, wherein the second count value is generated by a counting unit before the first count value is generated, and the second count value represents the number of display lines of a previous frame preceding to the current frame; in response to that the current frame is the first frame after the frame rate changes, calculating a remainder generated by dividing the first count value by a period of an emission control signal, wherein the emission control signal is utilized for control driving an OLED display panel; and adjusting the emission control signal to compensate for an incomplete period of the emission control signal occurring in the end of the current frame period.

Based on the above, according to the OLED display control circuit and the OLED display control method of the disclosure, the OLED display control circuit can effectively reduce the image flickering when displaying image frames on the OLED display panel.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
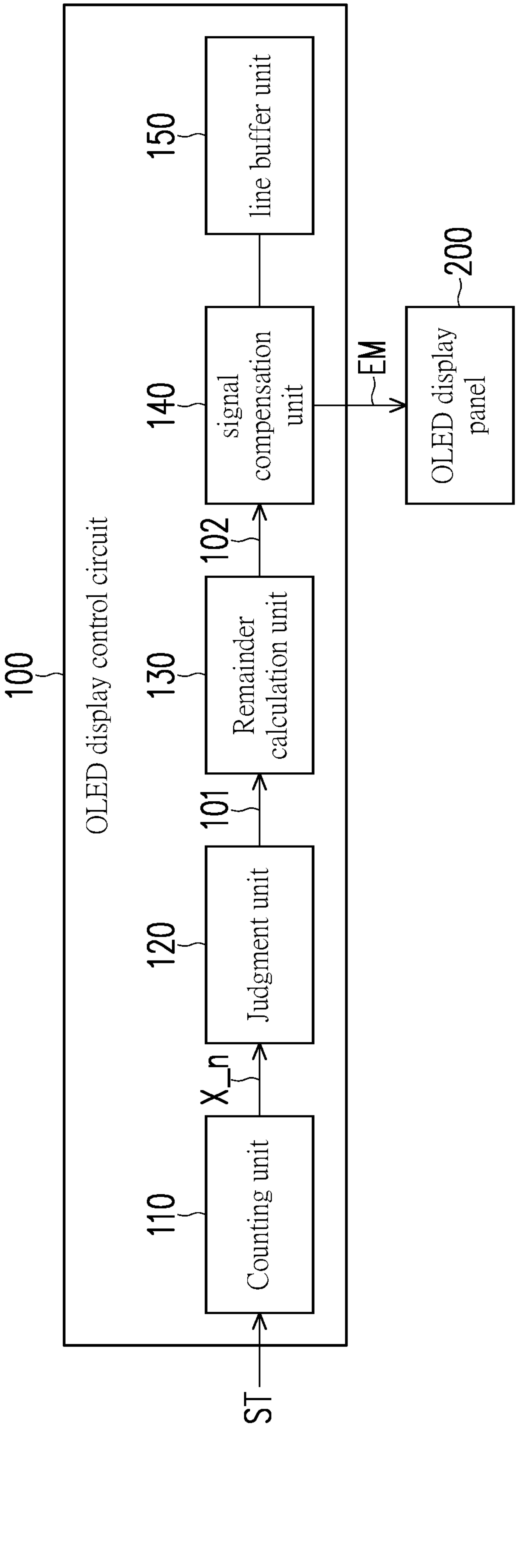
FIG. 1 is a schematic diagram of an OLED display control circuit according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

FIG. 1 is a schematic diagram of an OLED display control circuit according to an embodiment of the disclosure. Referring to FIG. 1, the OLED display control circuit 100 includes a counting unit 110, a judgment unit 120, a remainder calculation unit 130, a signal compensation unit 140 and a line buffer unit 150. The judgment unit 120 is coupled to the counting unit 110 and the remainder calculation unit 130. The signal compensation unit 140 is coupled to the line buffer unit 150 and an OLED display panel 200. In the embodiment of the disclosure, the counting unit 110 may be a counter circuit. The judgment unit 120, the remainder calculation unit 130 and the signal compensation unit 140 may be digital circuits. The line buffer unit 150 may be a cache circuit. In one embodiment of the disclosure, the OLED display control circuit 100 may not have the line buffer unit 150.

Figure 2:
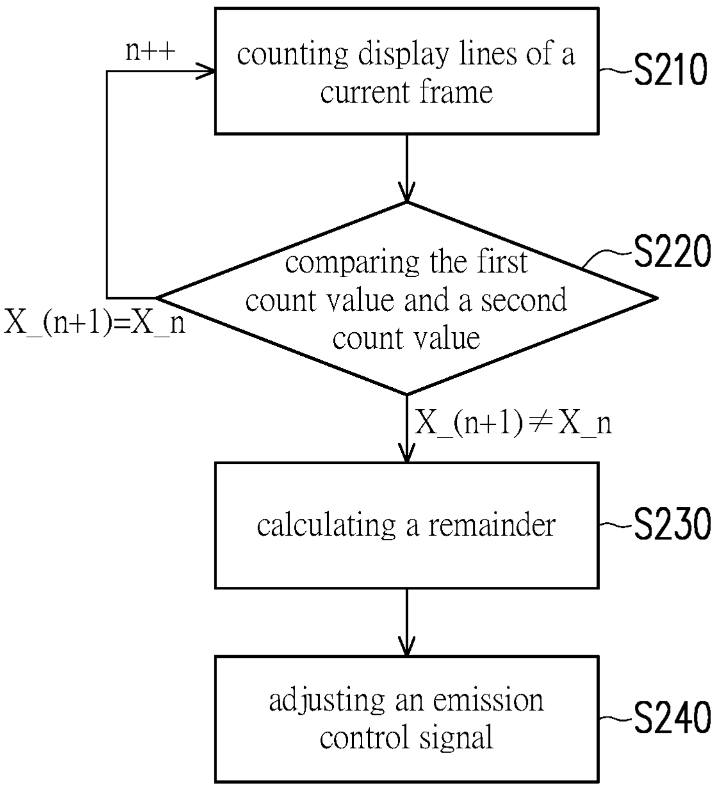
FIG. 2 is a flowchart of an OLED display control method according to an embodiment of the disclosure.

FIG. 2 is a flowchart of an OLED display control method according to an embodiment of the disclosure. Referring to FIG. 1 and FIG. 2, the OLED display control circuit 100 may execute the following steps S210 to S240. In the embodiment of the disclosure, the counting unit 110 may receive a vertical synchronization signal ST. For the convenience to distinguish a previous frame and a current frame, in the following descriptions, let n and n+1 be the time orders of two frames which are adjacent in time domain and use n+1 to represent the time order of the current frame. In step S210, with respect to each frame, the counting unit 110 may count display lines (or called horizontal lines) of a current frame (i.e. calculating the number of display lines to be displayed in a frame period) according to the vertical synchronization signal ST to generate a first count value X_(n+1) representing the number of display lines of the current frame, where n is a variable indicating the time order and the value of n is a positive integer. The counting unit 110 may provide the first count value X_(n+1) to the judgment unit 120.

In step S220, the judgment unit 120 may compare the first count value X_(n+1) of the (n+1)-th frame (as a current frame) and a second count value X_n of the n-th frame (as a previous frame preceding to the current frame) to generate a judgment result 101. The second count value X_n is generated by the counting unit 110 before the first count value X_(n+1) is generated. In the embodiment of the disclosure, if the first count value X_(n+1) is equal to the second count value X_n (remarked by X_(n+1)=X_n in FIG. 2), it means that refresh rate does not change, i.e., the variable refresh rate (VRR) function is not executed, then the OLED display control circuit 100 returns to execute step S210 (remarked by n++ in FIG. 2) to count display lines of a next frame such as the (n+2)-th frame. If the first count value X_(n+1) of the (n+1)-th frame does not equal to the second count value X_n of the n-th frame (remarked by X_(n+1)≠X_n in FIG. 2), it means that the VRR function is executed, and then the OLED display control circuit 100 executes step S230. The judgment unit 120 may provide the judgment result 101 to the remainder calculation unit 130.

In step S230, in response to that the current frame is the first frame after the frame rate changes (and for example, the n-th frame is displayed under 60 Hz and the (n+1)-th frame as the current frame is the first frame displayed under 40 Hz after frame rate changes), the remainder calculation unit 130 may calculate a remainder 102 generated by dividing the first count value by a period of an emission control signal EM. The emission control signal EM is utilized for control driving the OLED display panel 200. The remainder calculation unit 130 may output the remainder 102 to the signal compensation unit 140.

In step S240, the signal compensation unit 140 may adjust the emission control signal EM to compensate for an incomplete period of the emission control signal EM occurring in the end of the current frame period, so as to generate the compensated emission control signal EM, and provide the compensated emission control signal EM to the OLED display panel 200. Moreover, the OLED display control circuit 100 restart to execute step S210 to count display lines of a next frame.

In the embodiment of the disclosure, the OLED display control circuit 100 may determine whether a frame rate of each frame is changed by comparing a corresponding previously frame, so as to automatically and dynamically compensate the emission control signal EM. Therefore, the OLED display control circuit 100 may effectively reduce the image flickering when displaying image frames on the OLED display panel 200 when the frame rate of the image signal provided by the image source device changes.

Figure 3:
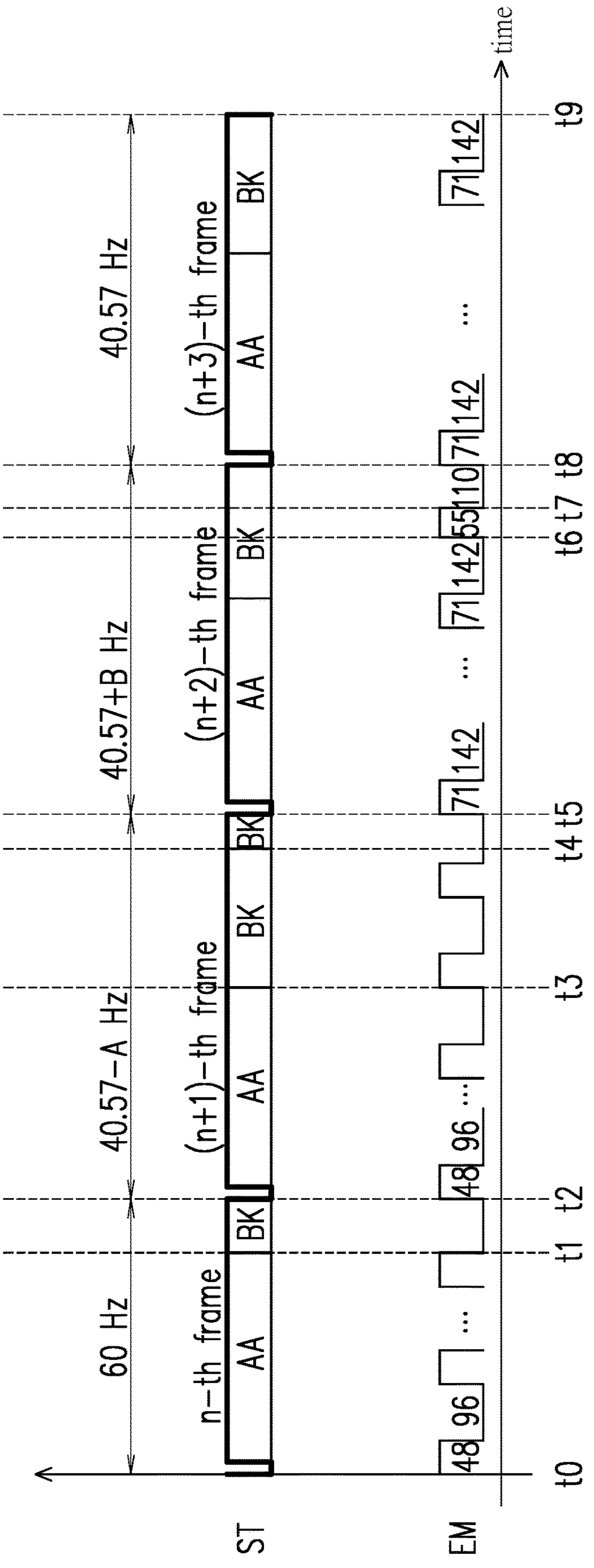
FIG. 3 is a schematic diagram of a vertical synchronization signal and an emission control signal according to an embodiment of the disclosure.

For example, FIG. 3 is a schematic diagram of a vertical synchronization signal and an emission control signal according to an embodiment of the disclosure. Referring to FIG. 1 and FIG. 3, during n-th frame period from time t0 to time t2, the counting unit 110 may count the display lines of the n-th frame according to the vertical synchronization signal ST, so as to obtain a count value (second count value) of the n-th frame. A period from time t0 to time t1 is a data writing period AA of the n-th frame period, and a period from time t1 to time t2 is a blanking period BK of the n-th frame period.

During the (n+1)-th frame period from time t2 to time t4, the counting unit 110 may count the display lines of the (n+1)-th frame according to the vertical synchronization signal ST, so as to obtain a count value (first count value) of the (n+1)-th frame. Due to the frame rate is changed after time t2, for example, the frame rate may be changed from 60 Hz to 40.57 Hz, the judgment unit 120 may judge that the first count value does not equal to the second count value, so that the remainder calculation unit 130 may calculate the remainder by dividing the first count value by a number of display lines (i.e. 48+96=144) of one period (a time interval from a rising edge to a next rising edge) of the emission control signal EM. Therefore, the signal compensation unit 140 may extend the blanking period BK of the vertical synchronization signal ST during the (n+1)-th frame period from time t2 to time t5 according to the remainder, and extend an off-time of the incomplete period of the emission control signal EM occurring in the end of the current frame period from time t4 to time t5, so that the frame rate of the (n+1)-th frame period may be changed, for example, from 40.57 Hz to (40.57-A)Hz, where A is a positive number. In this embodiment, extending blanking period may be cooperated with using more buffer space of line buffer unit.

Moreover, the last period from time t6 to time t8 of the emission control signal EM in the (n+2)-th frame period may be shorten, but the duty ratio of the last period may be maintained. Thus, the frame rate of the (n+2)-th frame may be changed, for example, from 40.57 Hz to (40.57+B)Hz, where B is a positive number. Furthermore, the frame rate of the (n+3)-th frame and the subsequent frames may be returned to the target frame rate 40.57 Hz.

Therefore, the OLED display control circuit 100 may effectively reduce image flickering when displaying image frames on the OLED display panel 200 when the frame rate of the image signal provided by the image source device changes after time t2.

Figure 4:
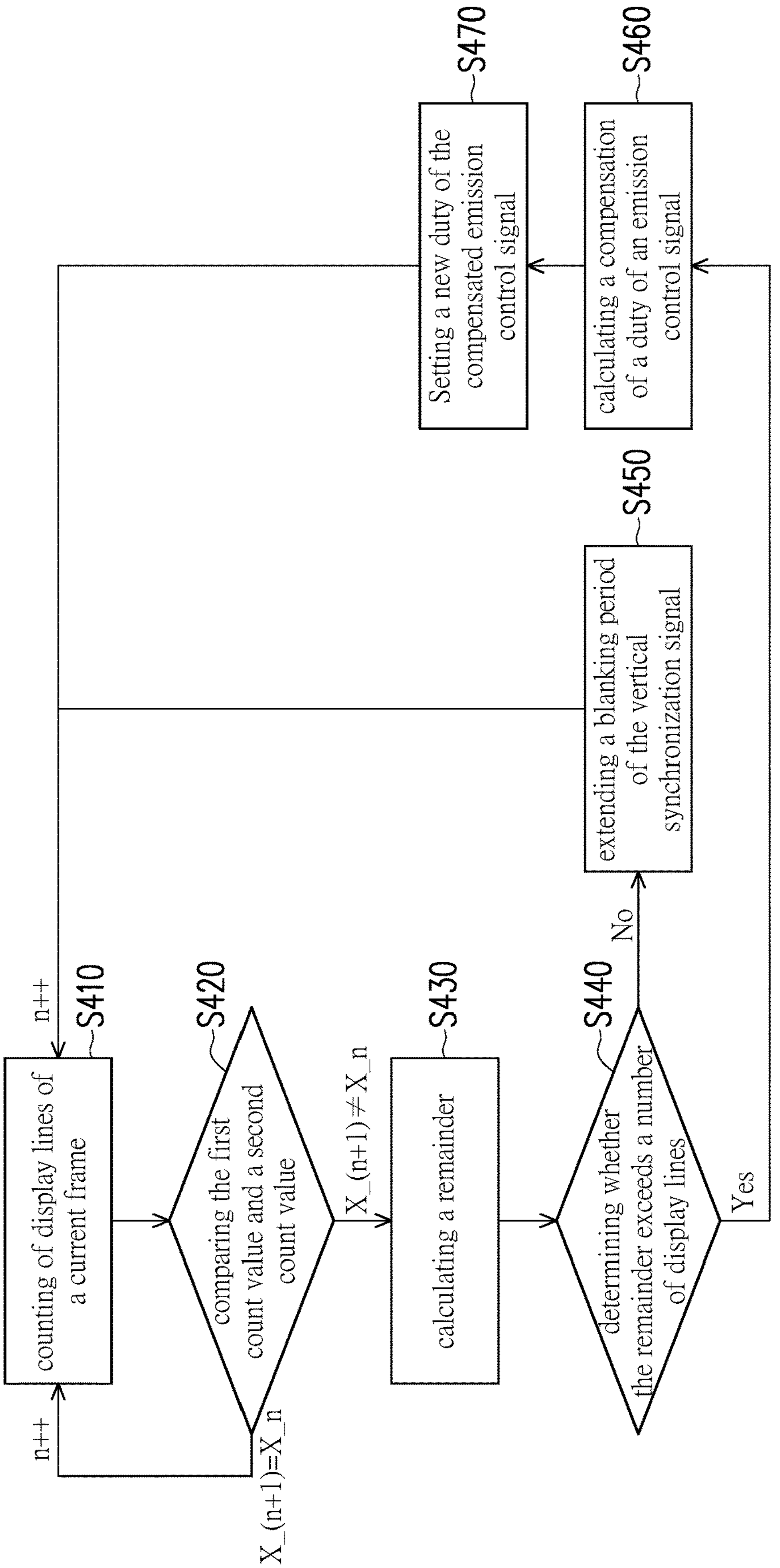
FIG. 4 is a flowchart of an OLED display control method according to an embodiment of the disclosure.

FIG. 4 is a flowchart of an OLED display control method according to an embodiment of the disclosure. Referring to FIG. 1 and FIG. 4, the OLED display control circuit 100 may execute the following steps S410 to S470. In the embodiment of the disclosure, the counting unit 110 may receive the vertical synchronization signal ST. In step S410, with respect to each current frame, the counting unit 110 may count display lines (or called horizontal lines) of a current frame (i.e. calculating a number of display lines to be displayed within a frame period) according to the vertical synchronization signal ST to generate a first count value X_(n+1) representing the number of display lines of the current frame. The counting unit 110 may provide the first count value X_(n+1) to the judgment unit 120.

In step S420, the judgment unit 120 may compare the first count value X_(n+1) and a second count value X_n to generate a judgment result 101. The second count value X_n is generated by the counting unit 110 before the first count value X_(n+1) is generated, and the second count value X_n represents the number of display lines of a previous frame preceding to the current frame. In the embodiment of the disclosure, if the first count value X_(n+1) is equal to the second count value X_n (i.e. X_(n+1)=X_n), it means that the VRR function is not executed, then the OLED display control circuit 100 returns to execute step S210 to count display lines of a next frame (i.e. n++). However, if the first count value X_(n+1) does not equal to the second count value X_n (i.e. X_(n+1)≠X_n), it means that the VRR function is executed, and then the OLED display control circuit 100 executes step S230. The judgment unit 120 may provide the judgment result 101 to the remainder calculation unit 130.

In step S430, in response to that the current frame is the first frame after the frame rate changes, the remainder calculation unit 130 may calculate a remainder 102 generated by dividing the first count value by a period of an emission control signal EM. The remainder calculation unit 130 may output the remainder 102 to the signal compensation unit 140.

In step S440, the signal compensation unit 140 may determine whether the remainder exceeds a number of display lines which are able to be accommodated in the line buffer unit 150. In response to determining that the remainder does not exceed the number of display lines which are able to be accommodated in the line buffer unit 150, in step S450, the signal compensation unit 140 may extend the blanking period of the vertical synchronization signal as the description of the above embodiments of FIG. 2 and FIG. 3.

Moreover, in response to determining that the remainder exceeds the number of display lines which are able to be accommodated in the line buffer unit 150, in step S460, the signal compensation unit 140 may calculate a compensation of a duty of the emission control signal EM. In step S470, the signal compensation unit 140 may set a new duty of the compensated emission control signal EM.

Figure 5:
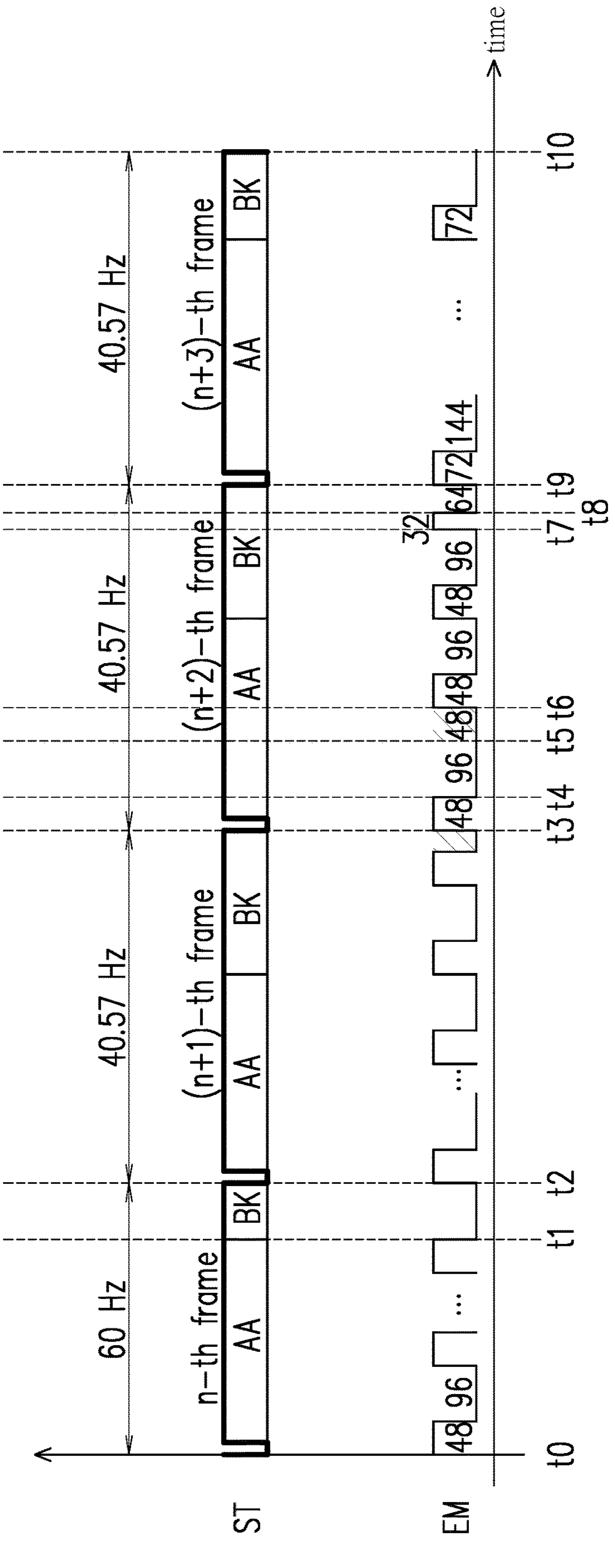
FIG. 5 is a schematic diagram of a vertical synchronization signal and an emission control signal according to an embodiment of the disclosure.

For example, FIG. 5 is a schematic diagram of a vertical synchronization signal and an emission control signal according to an embodiment of the disclosure. Referring to FIG. 1 and FIG. 5, the following embodiment of FIG. 5 is provide a method for setting the new duty of the compensated emission control signal EM. During n-th frame period from time t0 to time t2, the counting unit 110 may count the display lines of the n-th frame according to the vertical synchronization signal ST, so as to obtain an n-th count value of the n-th frame.

During (n+1)-th frame period from time t2 to time t3, the counting unit 110 may count the display lines of the (n+1)-th frame according to the vertical synchronization signal ST, so as to obtain a first count value of the (n+1)-th frame. Due to the frame rate is changed after time t2, for example, the frame rate may be changed from 60 Hz to 40.57 Hz, the judgment unit 120 may judge that the first count value of the (n+1)-th frame does not equal to the second count value of the n-th frame, so that the remainder calculation unit 130 may calculate the remainder by dividing the first count value by a number of display lines (i.e. 48+96=144) of one cycle (i.e. a time interval from rising edge to next rising edge) of the emission control signal EM.

Moreover, in response to determining that the remainder is greater than the number of display lines allowable to be processed by the line buffer unit 150, the signal compensation unit 140 may adjust the emission control signal EM by setting an off-time (i.e. the off-time is changed from time t4 to time t5 to time t4 to time t6) applied to the first period from time t3 to time t6 of the emission control signal EM in the (n+2)-th frame period according to the remainder. That is, the signal compensation unit 140 may set a new duty of the first period from time t3 to time t6 of the emission control signal EM in the (n+2)-th frame period, so that the off-time (i.e. a period from time t4 to time t6) applied to the first period of the emission control signal in the (n+2)-th frame period comprises the remainder (i.e. the addition period from time t5 to time t6). In addition, the last period from time t7 to time t9 of the emission control signal EM in the (n+2)-th frame period may be corresponding adjusted, but the duty ratio of the last period may be maintained.

Thus, the frame rate of the (n+1)-th to (n+3)-th frame periods may be maintained at, for example, 40.57 Hz. Therefore, the OLED display control circuit 100 may effectively reduce image flickering when displaying image frames on the OLED display panel 200 when the frame rate of the image signal provided by the image source device changes after time t2.

Figure 6:
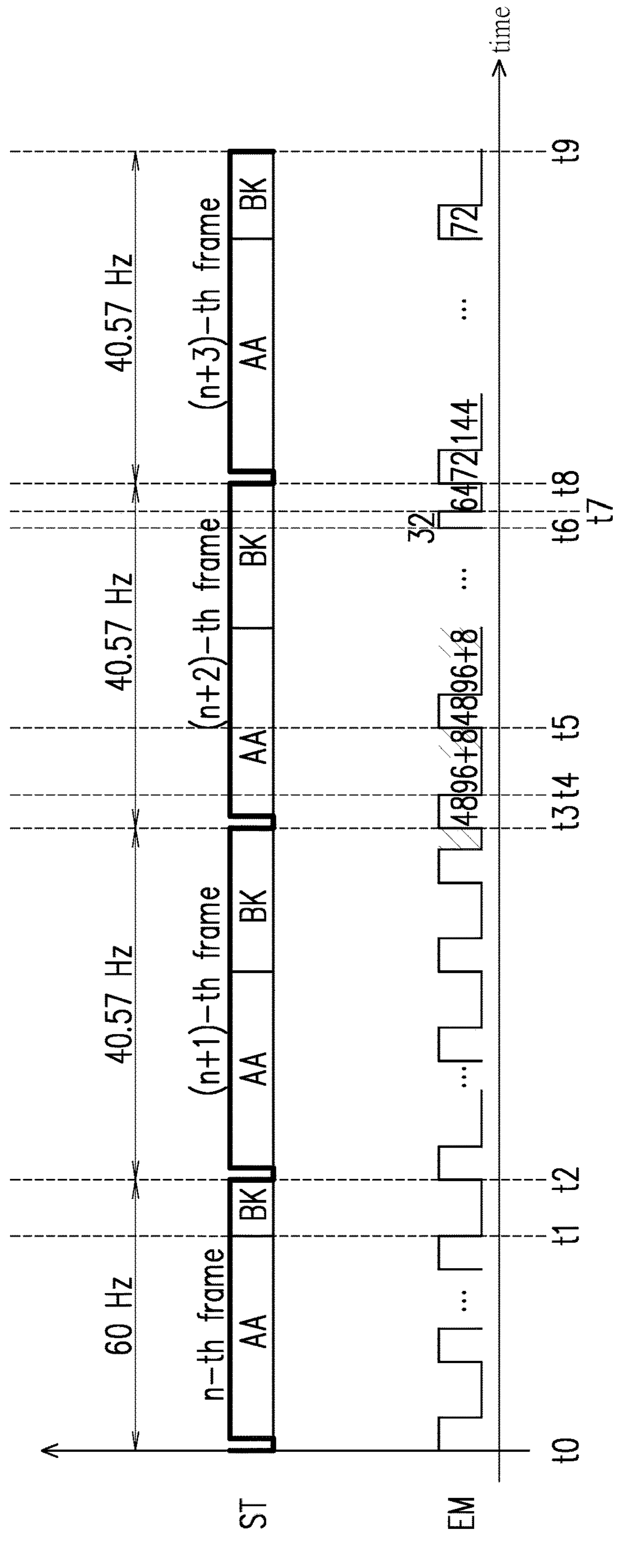
FIG. 6 is a schematic diagram of a vertical synchronization signal and an emission control signal according to an embodiment of the disclosure.

For example, FIG. 6 is a schematic diagram of a vertical synchronization signal and an emission control signal according to an embodiment of the disclosure. Referring to FIG. 1 and FIG. 6, the following embodiment of FIG. 6 is provide another method for setting the new duty of the compensated emission control signal EM. During n-th frame period from time t0 to time t2, the counting unit 110 may count the display lines of the n-th frame according to the vertical synchronization signal ST, so as to obtain a count value of the n-th frame (as second count value).

During (n+1)-th frame period from time t2 to time t3, the counting unit 110 may count the display lines of the (n+1)-th frame according to the vertical synchronization signal ST, so as to obtain a first count value of the (n+1)-th frame. Due to the frame rate is changed after time t2, for example, the frame rate may be changed from 60 Hz to 40.57 Hz, the judgment unit 120 may judge that the first count value of the (n+1)-th frame does not equal to the second count value of the n-th frame, so that the remainder calculation unit 130 may calculate the remainder by dividing the (n+1)-th count value by a number of display lines (i.e. 48+96=144) of one cycle (i.e. a time interval from rising edge to falling edge to next rising edge) of the emission control signal EM.

Moreover, in response to determining that the remainder is greater than the number of display lines allowable to be processed by the line buffer unit 150, the signal compensation unit 140 may adjust the emission control signal EM by setting an off-time applied to each of a plurality of periods of the emission control signal EM in the (n+2)-th frame period according to the remainder. That is, the signal compensation unit 140 may set a new duty of the each of a plurality of periods of the emission control signal EM in the (n+2)-th frame period, so that the each off-time of the plurality of periods of the emission control signal in the (n+2)-th frame period comprises a partial remainder (i.e., 96+8, where 8 is a partial remainder) which is determined by dividing the remainder by the number of the periods where the updated off-time is applied. In addition, the last period from time t6 to time t8 of the emission control signal EM in the (n+2)-th frame period may be corresponding adjusted, but the duty ratio of the last period may be maintained.

Thus, the frame rate of the (n+1)-th to (n+3)-th frame periods may be maintained, for example, at 40.57 Hz and the OLED display control circuit 100 may effectively reduce image flickering when displaying image frames on the OLED display panel 200 when the frame rate of the image signal provided by the image source device changes after time t2.

In summary, the OLED display control circuit and the OLED display control method of the disclosure can effectively reduce image flickering when display image frames on the OLED display panel when the panel executes the VRR function.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An organic light emitting diode (OLED) display control circuit, comprising:

a counting unit, configured to, with respect to each current frame, count display lines of a current frame according to a vertical synchronization signal to generate a first count value representing the number of display lines of the current frame;

a judgment unit, coupled to the counting unit, and configured to compare the first count value and a second count value to generate a judgment result, wherein the second count value is generated by the counting unit before the first count value is generated, and the second count value represents the number of display lines of a previous frame preceding to the current frame;

a remainder calculation unit, coupled to the judgment unit, and configured to, in response to that the current frame is the first frame after the frame rate changes, calculate a remainder generated by dividing the first count value by a period of an emission control signal, wherein the emission control signal is utilized for control driving an OLED display panel; and a signal compensation unit, coupled to the remainder calculation unit, and configured to adjust the emission control signal to compensate for an incomplete period of the emission control signal occurring in the end of the current frame period.

2. The OLED display control circuit according to the claim 1, wherein the signal compensation unit is further configured to, in response to determining that the remainder does not exceed the number of display lines which are able to be accommodated in a line buffer unit, extend a blanking period of the vertical synchronization signal during the current frame period according to the remainder and extend an off-time of the incomplete period of the emission control signal occurring in the end of the current frame period.

3. The OLED display control circuit according to the claim 2, further comprising the line buffer unit.

4. The OLED display control circuit according to the claim 1, wherein the signal compensation unit adjusts the emission control signal by setting an off-time applied to the first period of the emission control signal in the next frame period according to the remainder, in response to determining that the remainder is greater than the number of display lines allowable to be processed by a line buffer unit.

5. The OLED display control circuit according to the claim 4, wherein the off-time applied to the first period of the emission control signal in the next frame period comprises the remainder.

6. The OLED display control circuit according to the claim 1, wherein the signal compensation unit adjusts the emission control signal by setting an off-time applied to each of a plurality of periods of the emission control signal in the next frame period according to the remainder, in response to determining that the remainder is greater than the number of display lines allowable to be processed by a line buffer unit.

7. The OLED display control circuit according to the claim 6, wherein each off-time of the plurality of periods of the emission control signal in the next frame period comprises a partial remainder which is determined by dividing the remainder by the number of the periods where the updated off-time is applied.

8. An organic light emitting diode (OLED) display control method, comprising:

with respect to each current frame, counting display lines of a current frame according to a vertical synchronization signal to generate a first count value representing the number of display lines of the current frame;

comparing the first count value and a second count value to generate a judgment result, wherein the second count value is generated by a counting unit before the first count value is generated, and the second count value represents the number of display lines of a previous frame preceding to the current frame;

in response to that the current frame is the first frame after the frame rate changes, calculating a remainder generated by dividing the first count value by a period of an emission control signal, wherein the emission control signal is utilized for control driving an OLED display panel; and adjusting the emission control signal to compensate for an incomplete period of the emission control signal occurring in the end of the current frame period.

9. The OLED display control method according to claim 8, further comprising:

in response to determining that the remainder does not exceed the number of display lines which are able to be accommodated in a line buffer unit, extending a blanking period of the vertical synchronization signal during the current frame period according to the remainder and extend an off-time of the incomplete period of the emission control signal occurring in the end of the current frame period.

10. The OLED display control method according to claim 8, wherein the step of adjusting the emission control signal comprises:

adjusting the emission control signal by setting an off-time applied to the first period of the emission control signal in the next frame period according to the remainder, in response to determining that the remainder is greater than the number of display lines allowable to be processed by a line buffer unit.

11. The OLED display control method according to claim 10, wherein the off-time applied to the first period of the emission control signal in the next frame period comprises the remainder.

12. The OLED display control method according to claim 8, wherein the step of adjusting the emission control signal comprises:

adjusting of the emission control signal by setting an off-time applied to each of a plurality of periods of the emission control signal in the next frame period according to the remainder, in response to determining that the remainder is greater than the number of display lines allowable to be processed by a line buffer unit.

13. The OLED display control method according to claim 12, wherein each off-time of the plurality of periods of the emission control signal in the next frame period comprises a partial remainder which is determined by dividing the remainder by the number of the periods where the updated off-time is applied.

* * * * *